US 6,674,358 B1

(12) United States Patent
Tinsley

(10) Patent No.: US 6,674,358 B1
(45) Date of Patent: Jan. 6, 2004

(54) HOLSTER WITH DETECTION FOR AN INSERTED ELECTRONIC DEVICE

(75) Inventor: Keith R. Tinsley, Northfield, IL (US)

(73) Assignee: Motorola, Inc., Schaumburg, IL (US)

( * ) Notice: Subject to any disclaimer, the term of this patent is extended or adjusted under 35 U.S.C. 154(b) by 557 days.

(21) Appl. No.: 09/754,484

(22) Filed: Jan. 4, 2001

(51) Int. Cl.[7] .............................. H04Q 1/30; H08B 5/22; H04B 1/00; B65D 25/04; B65D 24/10
(52) U.S. Cl. .................... 340/7.63; 340/5.85; 224/245
(58) Field of Search ................................. 340/7.63, 7.6, 340/5.85, 5.86, 568, 693.3, 573.1; 224/245, 666, 678, 930, 669, 89; 455/348, 351, 569, 90, 575; 379/433, 440, 349

(56) References Cited

U.S. PATENT DOCUMENTS

| | | | | |
|---|---|---|---|---|
| 5,043,721 A | * | 8/1991 | May ........................ 340/7.54 |
| 5,353,017 A | * | 10/1994 | Suzuki et al. ............... 340/7.37 |
| 5,418,520 A | * | 5/1995 | Hirshberg ................. 340/568.7 |
| 5,515,031 A | * | 5/1996 | Pereira et al. ............ 340/693.3 |
| 5,525,966 A | * | 6/1996 | Parish ...................... 340/568.1 |
| 5,642,095 A | * | 6/1997 | Cook ....................... 340/568.7 |
| 5,642,102 A | | 6/1997 | Panther et al. ......... 340/825.44 |
| 5,768,371 A | * | 6/1998 | Snyder ........................ 379/446 |
| 5,854,984 A | * | 12/1998 | Buhrmann et al. ....... 455/552.1 |
| 5,949,337 A | * | 9/1999 | Campman ................. 340/573.1 |
| 6,377,825 B1 | * | 4/2002 | Kennedy et al. ......... 455/569.2 |

* cited by examiner

Primary Examiner—Michael Horabik
Assistant Examiner—Nam V Nguyen
(74) Attorney, Agent, or Firm—Brian M. Mancini

(57) ABSTRACT

A holster for a telecommunication device includes a self-contained power source for driving an alert and a detector. The detector detects the presence and unseating of an telecommunication device that is insertable into the holster. The alert is coupled to the detector and is operable to alert to a user when the telecommunication device is removed from the holster. In this way the user is warned of the imminent loss or theft of the communication device.

16 Claims, 4 Drawing Sheets

HOLSTER WITH DETECTION FOR AN INSERTED ELECTRONIC DEVICE

FIELD OF THE INVENTION

The present invention relates generally to wireless telecommunication devices. More particularly, the invention relates to a holster for detecting the presence of a telecommunication device.

BACKGROUND OF THE INVENTION

Recent trends in consumer electronics have shown an increasing demand for smaller and lighter portable telecommunication devices, such as pagers, personal digital assistants and cellular telephones among others. As a result, these devices have become easily subject to loss or theft, without the knowledge of the owner. A particular problem exists for those applications where the device is worn on a belt clip, cradle or in a holster. For example, user actions such as sitting down or putting on or removing articles of clothing can dislodge the device from a holster, without the owner noticing. In addition, wearing the device on one's person but not directly in one's line of sight, such as with a belt holster, can readily subject the device to theft.

Typically, clips, cradles or holsters, only provide a mechanical connection for holding the device in question. However, in some cases the cradle or holster provides an electrical connection, such as an impedance, for use with an insertable electronic device in order for the electronic device to determine whether it is inserted into the cradle or holster. In this way, the electronic device changes it function, such as a display orientation. In these cases, the intelligence of determine whether the device has been inserted into a cradle or holster remains in the device, with the cradle or holster only providing a minor electrical function to provide a sensor or detect function. Moreover, the above cases do not provide any functionality to alert a user when a device is removed from the cradle or holster.

Given the demand for smaller telecommunication devices and wireless products, a holster or cradle needs to be realized that will insure that a user's capital investment will be secured from incidents of loss either through accident or theft. What is needed is a cradle or holster that has self-contained circuitry to provide an alert to a user when the device is removed or displaced from the cradle or holster. It would also be particularly advantageous to provide operational control to defeat any alert when the device is intentionally removed from the cradle or holster.

DETAILED DESCRIPTION OF THE PREFERRED EMBODIMENTS

The present invention will have application apart from the preferred embodiments described herein, and the description is provided merely to illustrate and describe the invention and it should in no way be taken as limiting of the invention. The present invention provides a cradle or holster that has self-contained circuitry to provide an alert to a user when the device is removed or displaced from the cradle or holster. In addition, operational control is provided to defeat any alert when the device is intentionally removed from the cradle or holster. Specifically, such operational control can be automatically activated or user selected.

Figure 1:
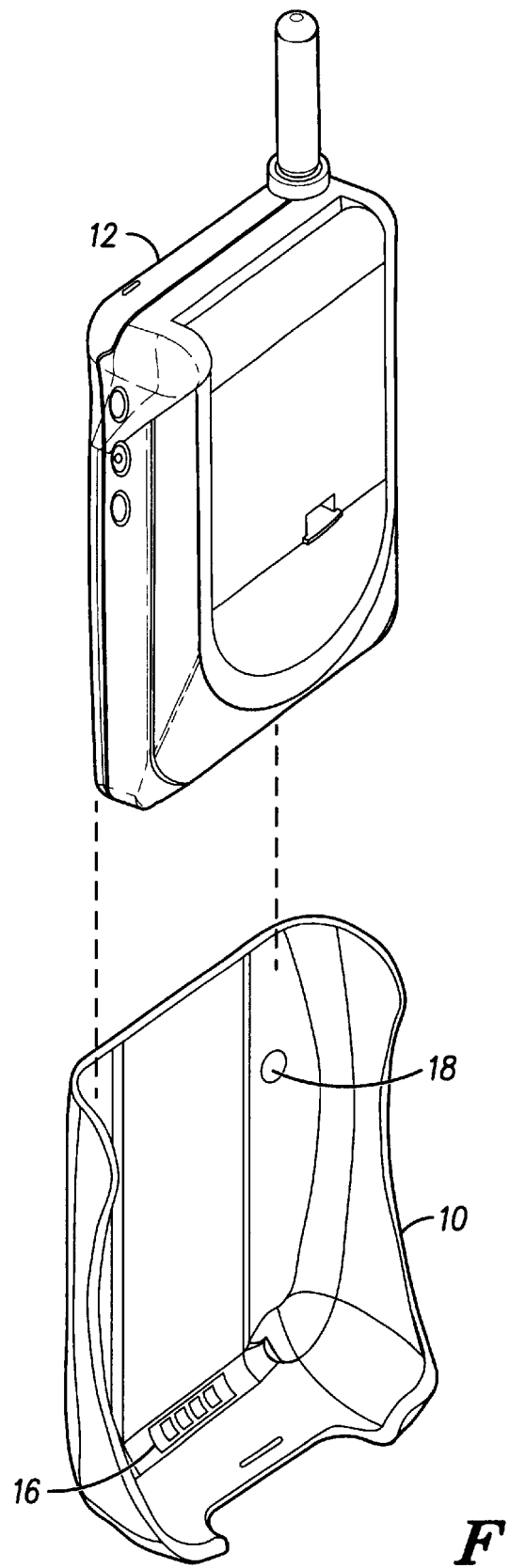
FIG. 1 is an exemplary perspective view of a holster with detection in conjunction with an insertable telecommunication device, in accordance with the present invention.

FIG. 1 is a view of a holster 10 and a electronic device 12. The electronic device 12 can be a computer, pager, cellular phone, PDA, or any other electronic device that can be inserted into the holster. For example, the electronic device 12 can be a portable telecommunication device that would best gain by the utilization of the present invention. Typically the holster 10 is worn outside the clothing of a user, most probably on a belt, by means of a belt clip or other fastener. However, it should be recognized that the holster need not be a belt clip nor even be worn on a user's person. The holster is a standard receptacle for the associated electronic device in form and fit. The present invention is equally suited to other holster or cradle arrangement such as a desktop docking station such as for a laptop computer, a desktop battery charger cradle, or other temporary cradle used with electronic devices.

The holster 10 is able to detect the presence of the insertable electronic device by means of a detector 16. The detector 16 is coupled to an alert 18 that is operable to alert to a user when the electronic device 12 is removed from the holster 10. As shown, the detector 16 is an electrical detection mechanism represented by a set of electrical contact that mate with corresponding contacts (not shown) on the electronic device. However, the detector can also be a mechanical switch or combination of mechanical switch and electrical detection mechanism.

Preferably, the detector 16 is an electrical detection mechanism that includes contacts to detect electrical continuity with the corresponding contacts on the electronic device. Such detection can be passive, such as detecting for a particular impedance, such as a short circuit or particular resistance for example, or active detecting utilizing electrical, optical or infrared signal changes, data exchange, or as much as a handshake transfer protocol.

The alert 18 consists of one or more of a vibratory alert and an audible alert. Audible alerts are most efficiently realized in a piezoceramic driver. Vibratory alerts generally consist of unbalanced motors.

Figure 2:
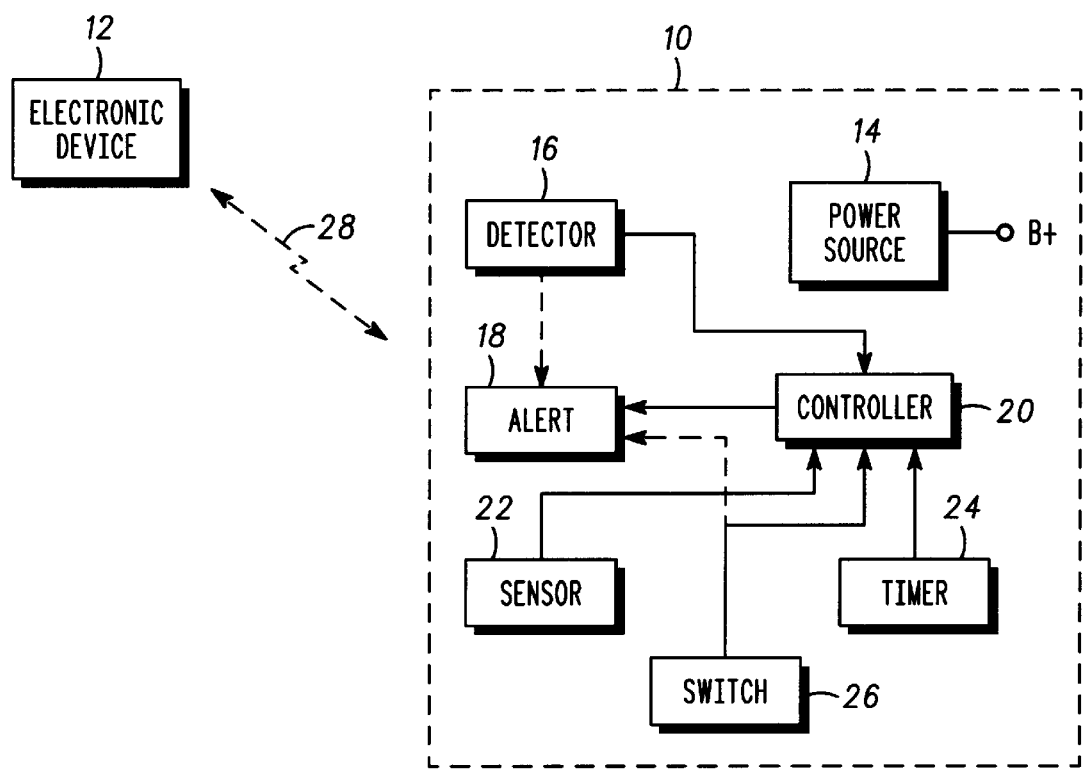
FIG. 2 is a simplified block diagram illustrating the holster of FIG. 1, in accordance with the present invention.

FIG. 2 shows a simplified block diagram of the holster circuitry of the present invention, including the elements of FIG. 1. All of the circuitry shown is contained in the holster housing. It should be recognized that some of the circuitry and interconnections are not shown for the sake of clarity. In a simplest first embodiment of the present invention a power source 14, such as a battery, is used to power all the holster circuitry including the alert 18 and the detector (if the detector is more than just a mechanical switch). The detector actuates the alert upon removal of the electronic device from the holster. For example, where the detector is a mechanical switch, removal of the electronic device from the holster throws the switch to connect power to sound the alert. Optionally, a user operable control or switch 26 can be provided to silence or activate the alert 18.

In operation, when an electronic device 12 is inserted into the holster 10, the detector 16 detects the presence of the electronic device and serves to maintain the alert 18 in a silent mode. Upon removal of the electronic device 12 from the holster 10, the detector 16 detects that the electronic device 12 has been removed and operates the alert 18. Of course, this is most useful in those cases where the electronic device is normally operated in its cradle or where the device is never to be removed from its cradle or holster under normal circumstances. However, in those applications where a user would ordinarily remove a device from its holster or cradle in order to properly use the device, it is preferred to provide a user control 26 to silence or defeat the alert either before or after removal of the device from the holster.

In a preferred embodiment of the present invention, a controller 20 is coupled to the detector and the alert to provide more intelligent operation of the alert or provide greater user flexibility in the operation of the holster. The controller can be a microcomputer chip, microcontroller, or other available circuit providing a control function. In particular, the controller 20 monitors the detector 16 for the removal of the insertable electronic device 12 and directs the alert 18 to operate so as to alert the user of the removal of the electronic device 12 from the holster 10.

In conjunction with the controller 20, it would also be advantageous to provide a timer 24 and a user operable switch 26 coupled with the controller 20. The timer 24 is used to measure the amount of time upon the removal of the electronic device 12 from the holster 10 in order to delay actuation of the alert 18. For example, upon removal of the device from its holster, if the timer times out before the switch is actuated, the controller directs the alert to operate so as to alert the user of the removal of the electronic device from the holster. In this way, an operator which purposefully removes the device from the holster, in order to properly use the device, can defeat the alert before it actuates by activating the switch. It is envisioned that a typical time delay would be about one to three seconds. This would give a user enough time to silence an alert before it sounds, and it would give a user an adequately short amount of time to notice that the phone has been dislodged or is being stolen.

The timer 24 can also be used by the controller 20 to direct the alert 18 to provide a repeating or periodic alert the user, instead of a constant alert, upon inadvertent removal of the electronic device from the holster, until the switch is activated. Such an alert can be given a distinguishing tone or pattern to better alert the user. It can also include a vibratory action. Optionally, the user operable switch 26 can include a number of keys or functions wherein a user would be required to enter particular keystrokes or a code in order to deactivate a sounding alert.

Figure 3:
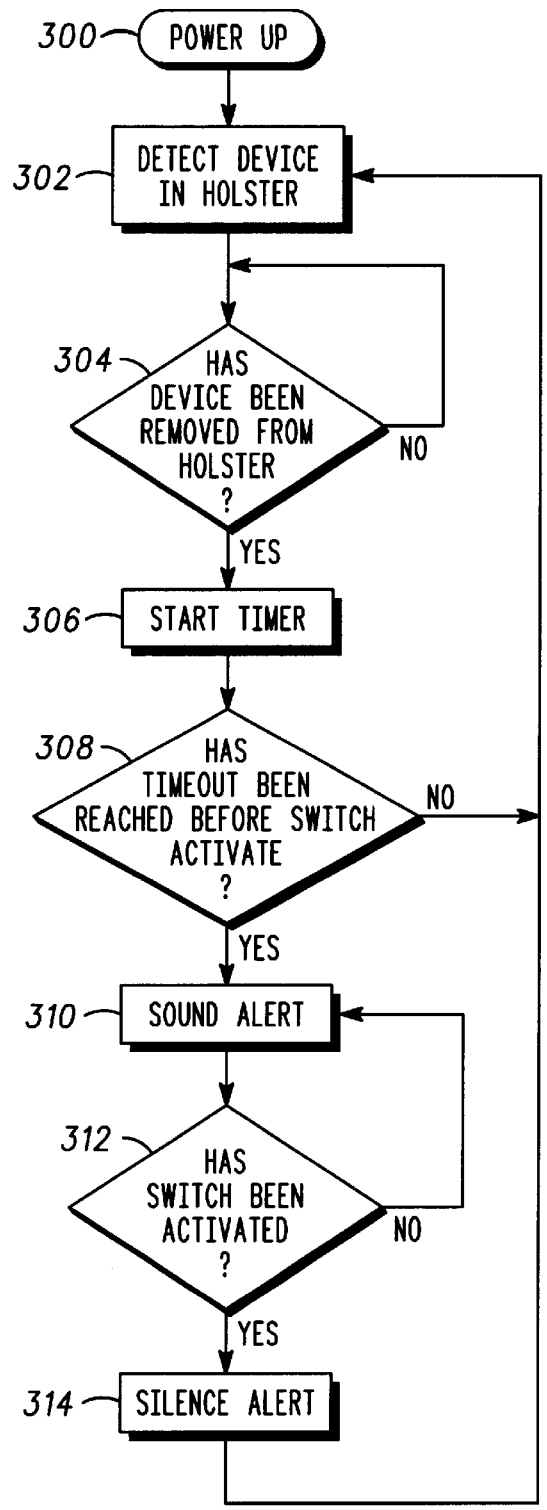
FIG. 3 is an exemplary flow chart of the operation of a preferred embodiment of the present invention.

In operation of the preferred embodiment, referring to FIG. 3, after powering up 300 the holster circuitry, the detector waits until it detects 302 the electronic device as being inserted into the holster. At this point, the detector continually monitors 304 for the removal of the device from the holster. Upon removal of the device from the holster, a timer is started 306. Typically, the timer function is internal to the controller, such as a microprocessor or other generally available controller circuit. However, the timer can be an independent circuit. The timer (i.e. controller) determines 308 the first of two actions: either the timer reaches a predetermined timeout period, or the user activates the user operable switch or control. If the user activates the switch before timeout, the alert is aborted and the holster returns to wait for detection 302 of the device in the holster. However, if a timeout occurs before the user can activate the switch, the alert will sound 310. The alert will continue to sound for another predetermined period, but it is preferred that the user must activate the user operable control or switch 312 before the alert will silence 314. Once the alert is silenced, the holster returns to wait for detection 302 of the device in the holster.

In an alternate embodiment of the invention, referring back to FIG. 2, the holster 10 further includes a timer 24 and a sensor 22 coupled with the controller 20. As before, the timer 24 is used to measure the amount of time upon the removal of the electronic device 12 from the holster 10. However, instead of the user operable switch, the sensor 22 senses an actuation of the electronic device 12, wherein if the timer 24 times out before the sensor 22 senses an actuation of the electronic device 12, the controller 20 directs the alert 18 to operate so as to alert the user of the removal of the electronic device 12 from the holster 10. In this embodiment, the user need not do any extra action to silence the alert other than the normal operation of the electronic device. The sensor 22 can include a receiver circuit that is tuned to receive a signal 28 from the electronic device indicating its actuation or operation, such as an electrical RF, IF or baseband communication signal 28 normally emanating from the device when in operation, or the device can include a special transmitter for this purpose such as an electromagnetic, optical or acoustic port. This embodiment can also include a user operable control or switch to provide redundant means to silence or control the alert, as described previously.

Figure 4:
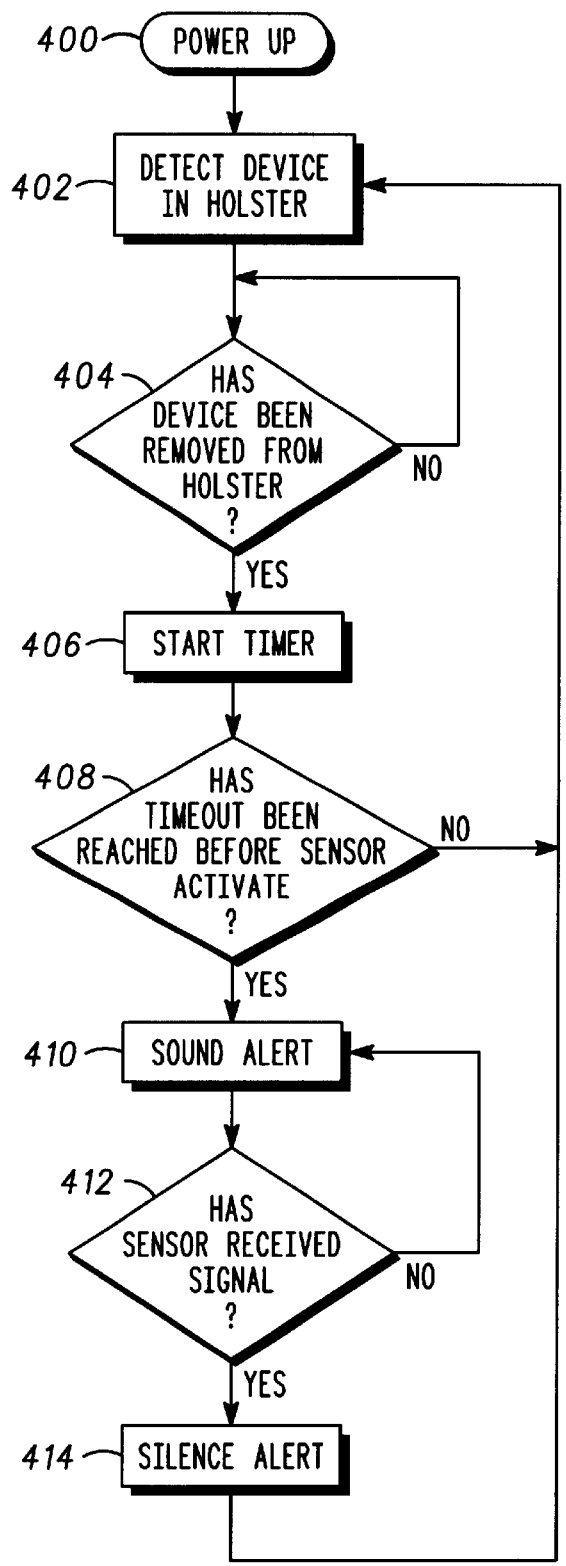
FIG. 4 is an exemplary flow chart of the operation of an alternate embodiment of the present invention.

In operation of the alternate embodiment, referring to FIG. 4, after powering up 400 the holster circuitry, the detector waits until it detects 402 the electronic device as being inserted into the holster. At this point, the detector continually monitors 404 for the removal of the device from the holster. Upon removal of the device from the holster, a timer is started 406. The timer determines 408 the first of two actions: either the timer reaches a predetermined timeout period, or the sensor of the holster activates in response to a signal from the device demonstrating its actuation. If the sensor is activated before timeout, the alert is aborted and the holster returns to wait for detection 402 of the device in the holster. However, if a timeout occurs before the sensor is activated, the alert will sound 410. The alert will continue to sound for another predetermined period, but it is preferred that the user must actuate the device 412 before the alert will silence 414. The alert can also be actuated by the addition of a user operable switch or control as described previously. Once the alert is silenced, the holster returns to wait for detection 402 of the device in the holster.

Although the present invention provides an entire alert circuit independently contained within a holster, the present invention also encompasses such circuitry shared or entirely contained within the electronic device. For example, a cellular phone already contains many of the components previously described including a power source, alert, controller, timer and user operable switch. If only a detector were added to the cellular phone, the alert functionality of the present invention could be duplicated in the phone. Further, if a sensor as described above were added to the phone, and a transmitter added to the holster, the phone could alert the user of the phone's separation from its cradle. Moreover, a switch could be added to the holster to remotely actuate the cellular phone's alert, in order to locate a lost or missing phone. Optionally, a user could be required to enter particular keystrokes or a code on the cellular phone or holster in order to deactivate a sounding alert.

The above described embodiments provide an improvement over the prior art by providing the means to notify a user as to the inadvertent or unauthorized dislocation of an electronic device from its cradle or holster.

Many additional changes and modifications could be made to the invention without departing from the fair scope thereof. The scope of some changes is discussed above. The scope of others will become apparent from the appended claims.

What is claimed is:

1. A holster for an electronic device, the holster comprising:
   a self-contained power source;
   a detector that detects the presence of an insertable electronic device;
   an alert coupled to the detector;
   a controller coupled to the detector and the alert;
   a timer and a sensor coupled with the controller, wherein the timer measures the amount of time upon the removal of the electronic device from the holster as detected by the detector, and the sensor senses an actuation of the electronic device, and wherein if the timer times out before the sensor senses an actuation of the electronic device the controller directs the alert to operate so as to alert to a user when the electronic device is removed from the holster.

2. The holster of claim 1, wherein the detector includes at least one of the group of a mechanical switch and an electrical detection mechanism.

3. The holster of claim 1, wherein the electrical detection mechanism includes contacts to detect electrical continuity with corresponding contacts on the electronic device.

4. The holster of claim 1, wherein the alert consists of at least one of the group of a vibratory alert and an audible alert.

5. The holster of claim 1, further comprising a switch coupled with the controller, wherein the timer measures the amount of time upon the removal of the electronic device from the holster, and wherein if the timer times out before the switch is actuated the controller directs the alert to operate so as to alert the user of the removal of the electronic device from the holster.

6. The holster of claim 5, wherein the controller, when in an alert mode, directs the alert to periodically alert the user of the removal of the electronic device from the holster until the switch is activated.

7. The holster of claim 1, wherein the sensor includes a circuit tuned to receive a signal from the electronic device indicating its actuation.

8. A holster for a telecommunication device, the holster comprising:
   a battery;
   an electrical detection mechanism that detects the presence of an insertable telecommunication device;
   an alert coupled to the detector, the alert is operable to alert to a user when the telecommunication device is removed from the holster;
   a controller coupled to the electrical detection mechanism and the alert;
   a timer and a sensor coupled with the controller, wherein the timer measures the amount of time upon the removal of the telecommunication device from the holster, and the sensor senses an actuation of the telecommunication device, and wherein if the timer times out before the sensor senses an actuation of the telecommunication device the controller directs the alert to operate so as to alert the user of the removal of the telecommunication device from the holster.

9. The holster of claim 8, wherein the electrical detection mechanism includes contacts to detect electrical continuity with corresponding contacts on the telecommunication device.

10. The holster of claim 8, wherein the alert consists of at least one of the group of a vibratory alert and an audible alert.

11. The holster or claim 8, further comprising a switch coupled with the controller, wherein the timer measures the amount of time upon the removal of the telecommunication device from the holster, and wherein if the timer times out before the switch is actuated the controller directs the alert to operate so as to alert the user of the removal of the telecommunication device from the holster.

12. The holster of claim 11, wherein the controller, when in an alert mode, directs the alert to periodically alert the user of the removal of the telecommunication device from the holster until the switch is activated.

13. The holster of claim 8, wherein the sensor includes a circuit tuned to receive a signal from the telecommunication device indicating its actuation.

14. A holster for a telecommunication device, the holster comprising:
   a battery;
   an electrical detection mechanism that detects the presence of an insertable telecommunication device by detecting electrical continuity with corresponding contacts on the telecommunication device;
   an alert coupled to the detector, the alert is operable to alert to a user when the telecommunication device is removed from the holster;
   a controller coupled to the electrical detection mechanism and the alert, wherein the controller monitors the detector for the removal of the insertable telecommunication device and directs the alert to operate so as to alert the user of the removal of the telecommunication device from the holster;
   a switch coupled with the controller;
   a sensor coupled with the controller, the sensor senses an actuation of the telecommunication device; and
   a timer coupled with the controller that measures the amount of time upon the removal of the telecommunication device from the holster, wherein if the timer times out before the switch is actuated and the sensor senses an actuation of the telecommunication device the controller directs the alert to operate so as to alert the user of the removal of the telecommunication device from the holster.

15. The holster of claim 14, wherein the controller, when in an alert mode, directs the alert to periodically alert the user of the removal of the telecommunication device from the holster until the switch is activated.

16. The holster of claim 14, wherein the sensor includes a circuit tuned to receive an electrical signal from the telecommunication device indicating its actuation.

* * * * *